United States Patent [19]
Roach et al.

[11] Patent Number: 5,628,431
[45] Date of Patent: May 13, 1997

[54] PORTABLE MULTI-COMPARTMENT CHEMICAL STORAGE AND MIXING TANK

[75] Inventors: Matthew N. Roach, Apex; Neil Stapensea, Raleigh; Jon Webster, Cary, all of N.C.

[73] Assignee: BASF Corporation, Mount Olive, N.J.

[21] Appl. No.: 426,530

[22] Filed: Apr. 20, 1995

Related U.S. Application Data

[63] Continuation-in-part of Ser. No. 153,052, Nov. 17, 1993, Pat. No. 5,465,874.

[51] Int. Cl.$^6$ .................................................. B65D 83/14
[52] U.S. Cl. ................ 222/145.5; 222/399; 222/164.1; 222/608; 222/400.7
[58] Field of Search ................... 222/136, 145.1, 222/145.5, 145.6, 145.7, 145.8, 51, 399, 464.1, 400.7, 529, 608; 141/382; 137/614.2, 614.22, 148, 149.8

[56] References Cited

U.S. PATENT DOCUMENTS

| | | |
|---|---|---|
| 719,846 | 2/1903 | Neubert et al. . |
| 1,139,353 | 5/1915 | Ellis ........................................ 222/608 |
| 2,063,727 | 12/1936 | Davis . |
| 2,065,128 | 12/1936 | Eisinger . |
| 2,255,280 | 9/1941 | Colvin . |
| 2,511,291 | 6/1950 | Mueller ............................... 222/129 X |
| 2,550,356 | 4/1951 | Jarvis . |
| 2,621,830 | 12/1952 | Stow et al. . |
| 2,884,964 | 5/1959 | Tye . |
| 2,976,897 | 3/1961 | Beckworth . |
| 3,021,863 | 2/1962 | Low . |
| 3,221,931 | 12/1965 | Porter . |
| 3,256,907 | 6/1966 | Clark et al. . |
| 3,319,834 | 5/1967 | Steele . |
| 3,348,737 | 10/1967 | Yingst et al. . |
| 3,625,399 | 12/1971 | Heisler ................................ 222/399 X |
| 3,921,907 | 11/1975 | Anderson . |
| 3,967,920 | 7/1976 | Hill . |
| 4,019,652 | 4/1977 | Shu et al. . |
| 4,059,123 | 11/1977 | Bartos et al. . |
| 4,131,214 | 12/1978 | Rogers . |
| 4,228,933 | 10/1980 | Elson .................................... 222/400.7 |
| 4,390,035 | 6/1983 | Hill . |
| 4,398,554 | 8/1983 | Kondo . |
| 4,511,283 | 4/1985 | Duval et al. . |
| 4,887,651 | 12/1989 | Santiago . |
| 4,994,180 | 2/1991 | Sims et al. . |
| 5,016,817 | 5/1991 | Ghate et al. . |
| 5,082,142 | 1/1992 | Saidman et al. . |
| 5,150,822 | 9/1992 | Eitner, Jr. et al. . |
| 5,205,440 | 4/1993 | Matsushita . |
| 5,465,874 | 11/1995 | Roach et al. .................... 222/399 X |

FOREIGN PATENT DOCUMENTS 64-246637  9/1989  Japan .

*Primary Examiner*—Andres Kashnikow
*Assistant Examiner*—Kenneth Bomberg
*Attorney, Agent, or Firm*—Nixon & Vanderhye PC

[57] ABSTRACT

A portable holding and mixing tank system for at least two dissimilar liquids includes a tank having at least two fluid-isolated holding compartments (e.g., separate tank units or a dividing wall within the tank interior space) for holding a respective one of the dissimilar liquids. A manifold assembly defines respective channels for the dissimilar liquids and for pressurizing fluid supplied from a source thereof. The liquid and pressurizing fluid channels are fluid-connected to each of the holding compartments. A pressurizing supply conduit fluid-connects the source of pressurizing fluid to pressurizing fluid channel, while liquid supply risers respectively fluid connect the dissimilar liquids contained in each of the holding compartments to the liquid channel defined by the manifold assembly. A liquid discharge port fluid-connects the liquid channel defined by the manifold assembly. As a result, the dissimilar liquids within each of the holding compartments are forcibly introduced by means of the pressurizing fluid therewithin into the liquid channel defined by the manifold assembly and are mixed with one another within the liquid channel prior to discharge through the discharge port.

24 Claims, 7 Drawing Sheets

PORTABLE MULTI-COMPARTMENT CHEMICAL STORAGE AND MIXING TANK

CROSS-REFERENCE TO PARENT APPLICATION

This application is a continuation-in-part of commonly owned U.S. application Ser. No. 08/153,052 filed on Nov. 17, 1993 (now U.S. Pat. No. 5,465,874), the entire content of which is expressly incorporated hereinto by reference.

FIELD OF INVENTION

This invention is related to the field of liquid storage tanks and mixing systems. In preferred forms, the present invention is embodied in a closed tank system (i.e., the tank is not open to the ambient environment) which permits storage of at least two dissimilar liquid agricultural chemicals and, just prior to application, will allow a metered mixture of such chemicals to be dispensed to an agricultural applicator.

BACKGROUND AND SUMMARY OF INVENTION

It is oftentimes desirable to apply agricultural chemicals to crops so as to stimulate crop growth, control pests, alleviate crop disease or the like. However, since agricultural chemicals are not universally effective for all desired purposes, it is typically necessary for individual chemicals to be applied separately to crop fields. Such a multiple application technique, of course, increases the time needed in order to apply the individual chemicals to the crop fields and/or requires dedicated multiple application equipment to apply the chemicals simultaneously. As a direct result, therefore, application efficiency of the agricultural chemicals is diminished, while the cost associated with application is increased.

Premixing of the agricultural chemicals in desired ratios so that a single application pass over the crop field is an attractive alternative to the above-described multiple pass application technique. However, there are several real and nontrivial problems associated with premixing of agricultural chemicals. For example, many agricultural chemicals are not shelf-stable when mixed with one another. As a practical matter, therefore, such mixture instability precludes an agricultural chemical manufacturer from supplying end users with dissimilar agricultural chemicals premixed to desired application ratios.

Furthermore, the premixed agricultural chemicals would be subject to government registration procedures requiring, for example, user toxicological and product chemistry studies to be conducted prior to actual use even though each of the agricultural chemicals in the mixture have individually been registered. An exception under the government registration procedures exists, however, if the premixed agricultural chemicals can be supplied to their point of use and transferred to the crop applicator equipment without exposure to the user. Thus, even if it is assumed for the moment that the agricultural chemicals are storage-stable in the mixture, there is currently no known commercially viable means whereby the premixed agricultural chemicals can be stored and transferred to crop applicator equipment via a "closed" system—i.e., a system which precludes exposure of the user to the premixed chemicals during the storage and transfer procedures.

What has been needed, therefore, is a system whereby functionally and/or chemically dissimilar agricultural chemicals may be stored separately of one another in a self-contained tank, yet mixed in a desired ratio prior to crop application. It would furthermore be highly desirable if such a system could transfer the mixture of agricultural chemicals to crop applicator equipment without exposure to the end-user (i.e., so that the self-contained storage and mixing tank could qualify as a "closed" system for purposes of government regulatory rules). It is towards fulfilling such needs that the present invention is directed.

Broadly, the present invention is embodied in a self-contained pressurized and portable tank system whereby dissimilar agricultural chemicals can be stored separately of one another, yet are mixed at a selected ratio in response to transferal of the chemicals to crop applicator equipment. More specifically, the present invention is embodied in a portable holding and mixing tank system for liquid chemicals which includes a tank having at least two fluid-isolated holding compartments (e.g., separate tank units or a dividing wall within the tank interior space) for holding a respective one of the dissimilar liquid chemicals.

A manifold assembly defines respective channels for the liquid chemicals and for pressurizing fluid supplied from a source thereof. The liquid and pressurizing fluid channels are fluid-connected to each of the holding compartments. A pressurizing supply conduit fluid-connects the source of pressurizing fluid to the pressurizing fluid channel, while liquid supply risers respectively fluid-connect the liquid chemicals contained in each of the holding compartments to the liquid channel defined by the manifold assembly. A liquid discharge port fluid-connects the liquid channel defined by the manifold assembly.

As a result, the liquid chemicals within each of the holding compartments are forcibly introduced by means of the pressurizing fluid therewithin into the liquid channel defined by the manifold assembly and are mixed with one another within the liquid channel prior to discharge through the discharge port.

These, as well as other, aspects and advantages of the present invention will become more clear after careful consideration is given to the detailed description of the preferred exemplary embodiment thereof which follows.

BRIEF DESCRIPTION OF THE ACCOMPANYING DRAWINGS

Reference will hereinafter be made to the accompanying drawings wherein like reference numeral throughout the various FIGURES denote like structural elements, and wherein.

DETAILED DESCRIPTION OF THE PREFERRED EXEMPLARY EMBODIMENTS

Figure 1:
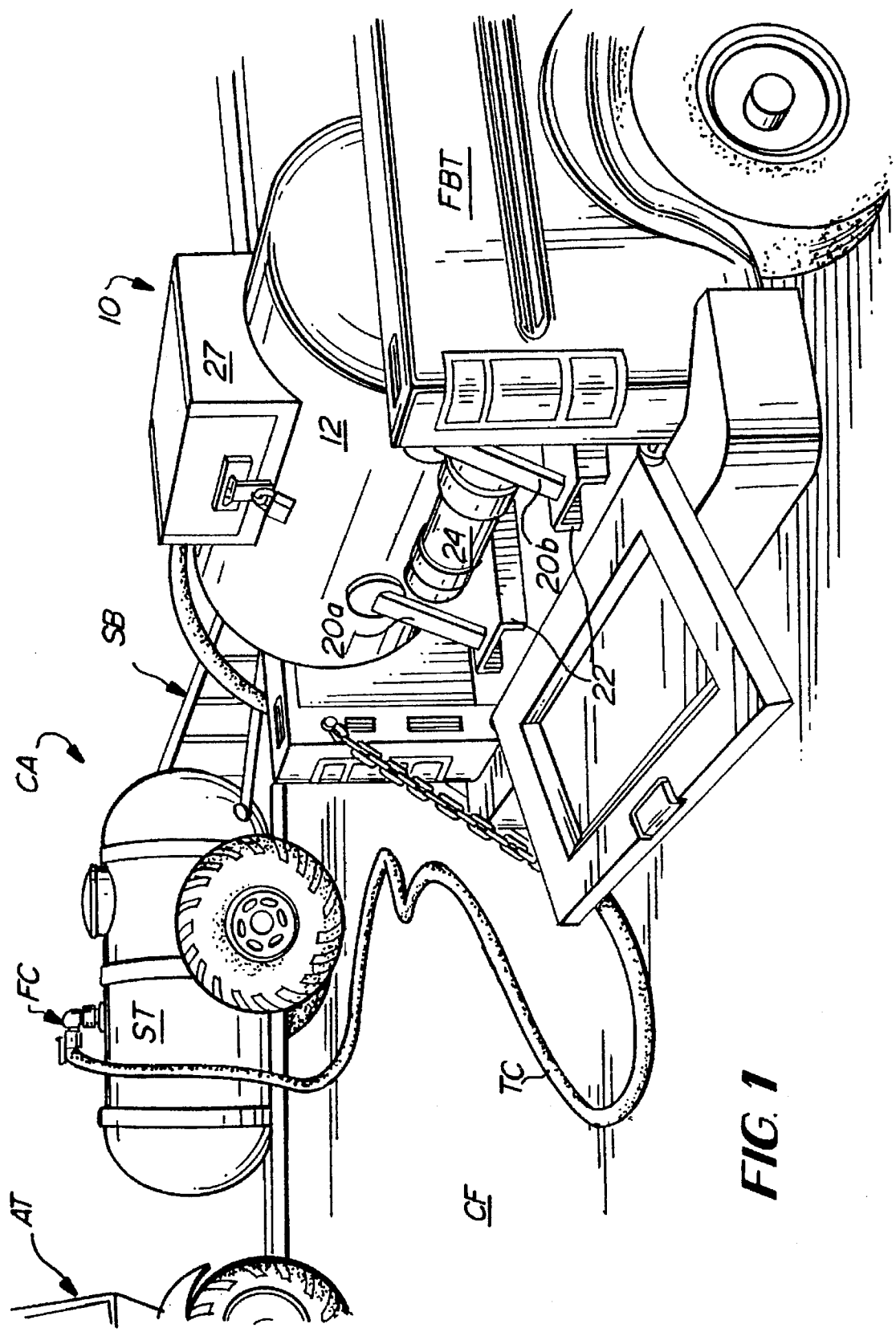
FIG. 1 is a perspective view showing the multi-compartment tank system in accordance with the present invention during an operation whereby a mixture of the individual agricultural chemicals contained thereby is transferred to crop applicator equipment.

Accompanying FIG. 1 depicts schematically the multi-compartment tank system 10 in accordance with the present invention during an operation whereby a mixture of the individual agricultural chemicals contained thereby is transferred to a wheeled supply tank ST associated with crop applicator equipment CA. As is well known, the crop applicator equipment CA may be moved across the crop field CF by any suitable vehicle, such as by the agricultural tractor AT shown in FIG. 1. The crop applicator equipment CA will typically include an application spray boom SB so that the liquid agricultural chemicals within the supply tank ST may be applied to the crop field CF at the desired application rate.

The multi-compartment tank system 10 in accordance with this invention may be brought physically onto the crop field by any suitable vehicle, such as by the flat bed truck FBT shown. Thus, the tank system 10 could be filled with the desired chemicals by the chemical manufacturer at its manufacturing facility or at a prearranged supply terminal, and thereafter shipped directly to the user. The user would then transfer the contents of the tank system 10 to the supply tank ST of the crop applicator equipment CA using a flexible transfer conduit TC equipped with a one-way flow coupling FC (to be discussed in greater detail below). The entire tank system 10 could then be returned by the end user to the manufacture for refilling purposes once the agricultural chemicals contained in the tank system 10 had been emptied into the supply tank ST.

Figure 2:
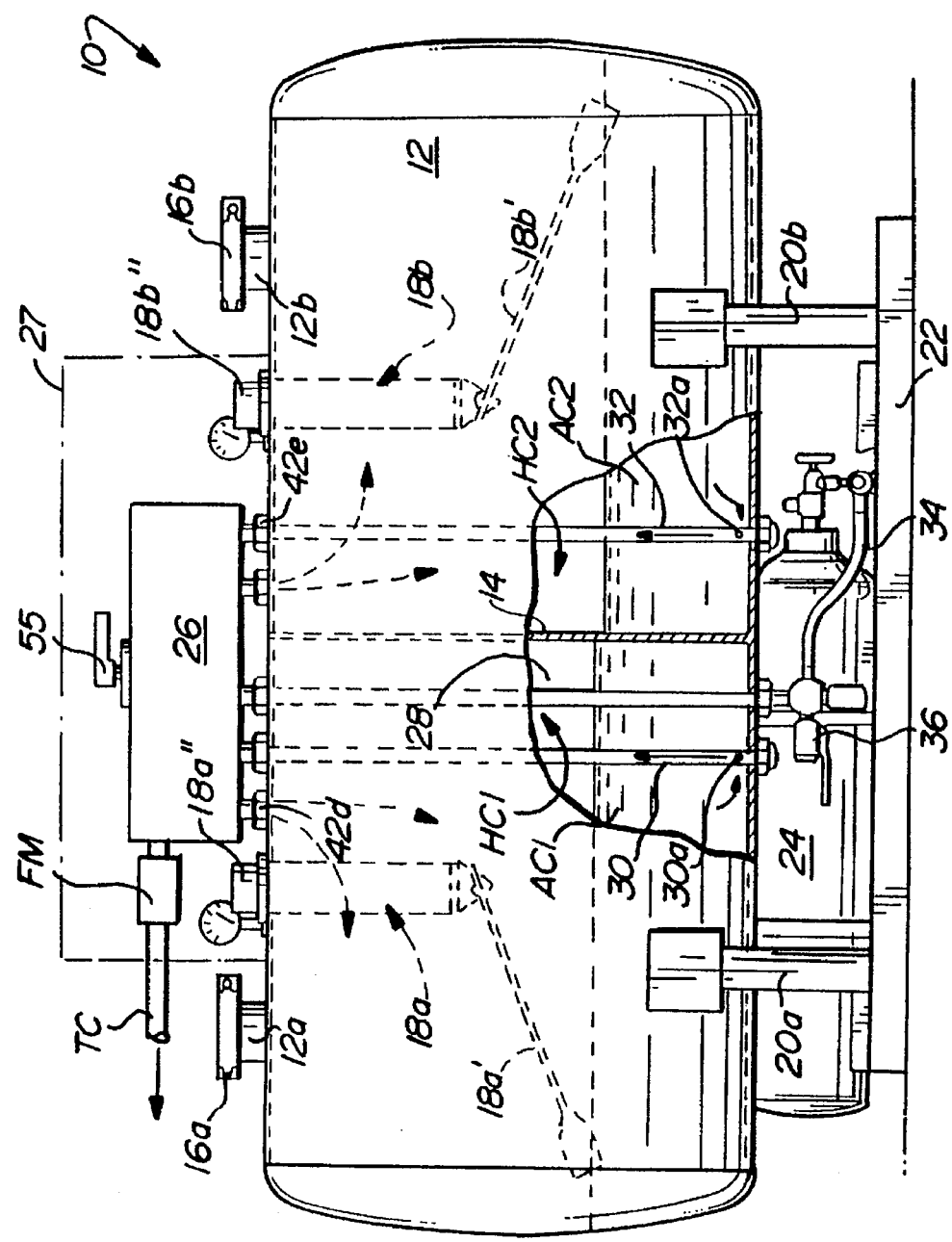
FIG. 2 is an elevational view, partly in section, of the multi-compartment tank system in accordance with the present invention.

The structural components associated with the tank system 10 in accordance with the present invention are more clearly shown in accompanying FIG. 2. In this regard, the tank system 10 will include a tank 12 having the desired geometrical configuration and volumetric capacity to contain two dissimilar agricultural chemicals AC1 and AC2. An interior dividing wall 14 subdivides the interior space of the tank 12 into two chemical holding compartments HC1 and HC2 for respectively holding the agricultural chemicals AC1 and AC2. The compartments HC1 and HC2 are, moreover, isolated from one another by virtue of the dividing wall 14 so as to prevent premature mixing of the agricultural chemicals AC1 and AC2. It will, of course, be realized by those skilled in the art that more than two such compartments may be provided so as to hold more than two dissimilar chemicals, in which case further dividing walls 14 would be present within the interior of the tank 12.

The tank 12 is provided with chemical supply ports 12a and 12b which allow the agricultural chemicals to be introduced into the holding compartments HC1 and HC2, respectively. Each of the supply ports 12a and 12b is closed by means of a vapor-tight cover 16a and 16b so as to prevent escape of the agricultural chemicals AC1 and AC2, respectively. The liquid level of each of the agricultural chemicals AC1 and AC2 within the holding compartments HC1 and HC2 may be determined by float level indicators 18a, 18b which respectively include a level float 18a', 18b' disposed within each of the holding compartments HC1 and HC2, and operatively connected to a sight level gauge 18a", 18b" disposed on the exterior of the tank 12.

The tank 12 is most preferably supported by pairs of support posts 20a, 20b which are rigidly connected to the tank 12 at upper ends thereof and to a support platform 22 at lower ends thereof. The support poses 20a, 20b are, moreover, of a sufficient length to provide for space to accommodate a cylinder 24 containing a source of pressurizing fluid (e.g., nitrogen gas) which serves to contain the liquid agricultural chemicals AC1 and AC2 under pressure and allows them to be forcibly transferred to the supply tank ST associated with the crop applicator equipment CA without necessarily requiring mechanical pumping means.

A manifold assembly 26 is mounted onto the tank 12 and is preferably contained within a security cover 27 (see also FIG. 1) to prevent unauthorized dispensing and/or tampering with the contents of the tank 12. As will be described in greater detail below, the manifold 26 distributively fluid-connects the pressurizing fluid of the cylinder 24 to each of the holding compartments HC1 and HC2 as well as providing a means by which the liquid agricultural chemicals AC1 and AC2 may simultaneously be withdrawn from their respective holding compartments HC1 and HC2, mixed with one another and then transferred via the transfer conduit TC to the spray tank ST associated with the crop applicator equipment CA. In this regard, the pressurizing fluid contained within the cylinder 24 is supplied to the manifold assembly 26 via the pressurizing riser 28, while each of the liquid agricultural chemicals AC1 and AC2 is supplied separately to the manifold assembly 26 via liquid supply risers 30 and 32, respectively. The liquid supply risers 30, 32 may be open at their lower ends and submerged below the liquid level of the agricultural chemicals AC1 and AC2, respectively. However, for purposes of structural integrity, it is preferred that each of the risers 30, 32 extend completely through the interior of the respective holding compartments HC1 and HC2, with inlet apertures 30a and 32a being provided near the bottom of tank 12. The pressurizing riser 28 is fluid-connected to the cylinder 24 via supply conduit 34 provided with a shut-off valve 36.

Figure 3:
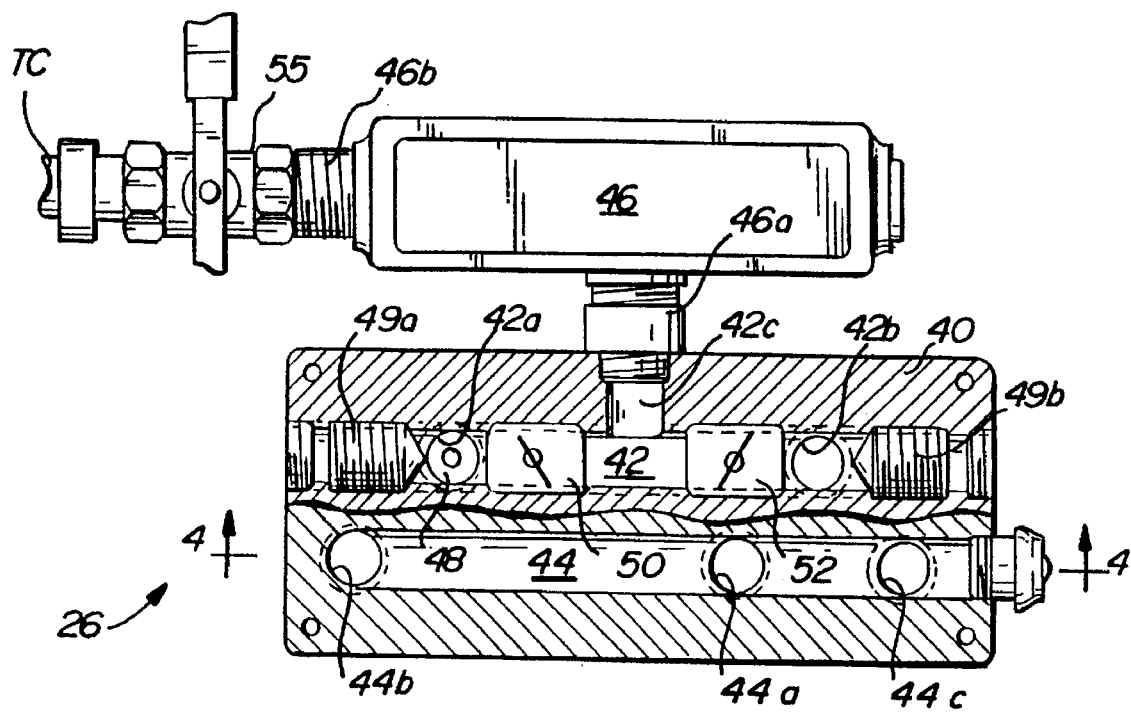
FIG. 3 is a cross-sectional plan view of a pressurization/mixing manifold assembly employed with the multi-compartment tank system in accordance with the present invention.
Figure 4:
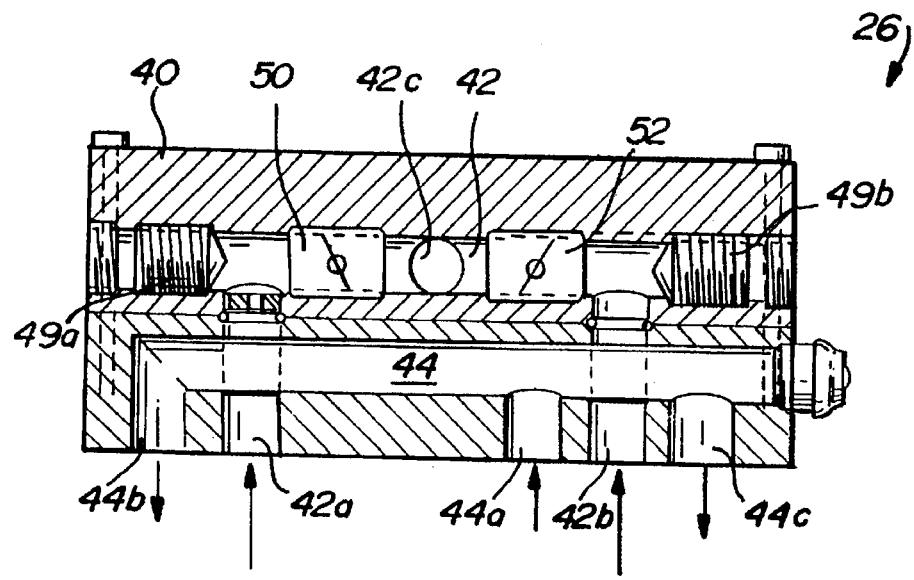
FIG. 4 is a cross-sectional elevational view of the manifold assembly shown in FIG. 3 as taken along line 3—3 therein.

The structural details of the manifold assembly 26 are better shown in accompanying FIGS. 3 and 4. As is seen, the manifold assembly 26 includes a housing block 40 which establishes interior liquid and gas distribution channels 42 and 44, respectively. The gas distribution channel 46 is fluid-connected to a gas-receiving port 44a and, depending upon the number of isolated holding chambers within the interior of tank 12, to a pair of gas-discharge ports 44b and 44c, the latter in turn being fluid-connected with the holding compartments HC1 and HC2 via nipples 42d and 42e, respectively (see FIG. 2). On the other hand, the liquid distribution channel 42 is fluid-connected to each of the liquid supply risers 30, 32 via inlet ports 42a, 42b, respectively, and to a mixing unit 46 via discharge port 42c.

A restrictive orifice 48 may be disposed in inlet port 42a so that the desired volume of liquid agricultural chemical AC1 is supplied to the distribution channel 42 and mixed in proper ratio to the liquid agricultural chemical AC2 supplied via inlet port 42b. Additionally or alternatively, metering of the liquid agricultural chemicals may be provided by metering screws 49a, 49b threadably coupled within the distribution channel 42. One-way flow valves 50, 52 are disposed in the liquid distribution channel 42 between the inlet ports 42a, 42b and the discharge port 42c, so as to prevent back4low of the agricultural chemicals AC1 and AC2, respectively.

Since the liquid agricultural chemicals AC1 and AC2 are introduced into the distribution channel 42 in direct axial opposition to one another, some mixing will occur prior to being discharged from the manifold 26 via discharge port 26c. However, it is preferred that a further mixing unit 46 be fluid connected at its inlet and discharge nipples 46a and 46b to the discharge port 42c and a proximal shut-off lo valve 55. Most preferably, the inlet and discharge nipples 46a, 46b, respectively will be oriented at right angles to one another. As a result, the preliminarily mixed liquid agricultural chemicals AC1 and AC2 discharged from port 42c will enter the mixing chamber (not shown) defined within the mixing unit 46 and, by virtue of the right angle orientation of the inlet and discharge nipples 46a and 46b, respectively, will be further mixed in a turbulent manner therewithin. The now thoroughly mixed agricultural chemicals AC1, AC2 will then flow through the transfer conduit TC to the spray tank ST associated with the crop applicator equipment CA. The flow of the mixed agricultural chemicals can be ascertained visually by a suitable flow meter FM (see FIG. 2).

Figure 5:
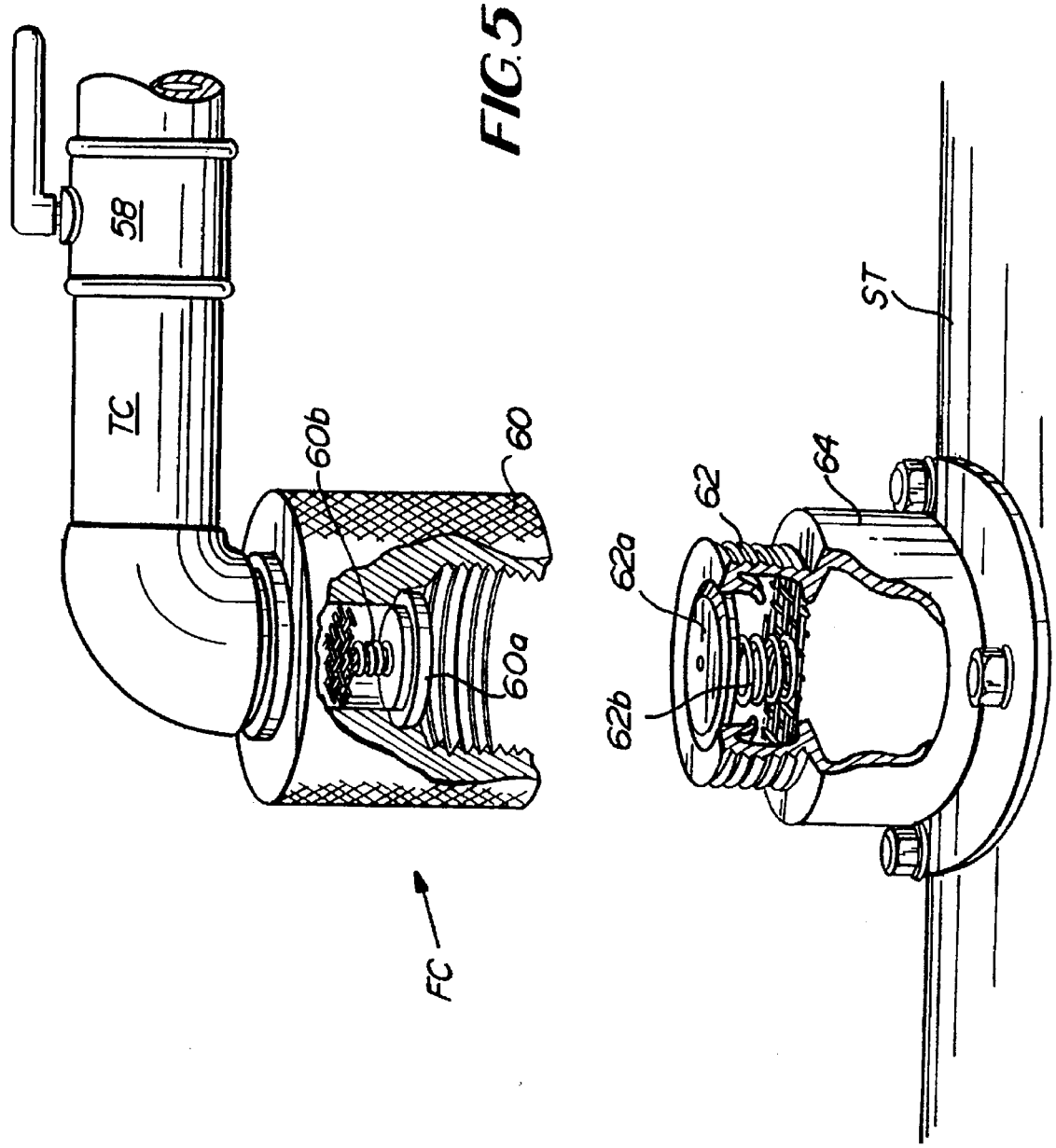
FIG. 5 is a perspective view, partly in section, of a preferred transfer coupling associated with the transfer conduit employed with the multi-compartment tank system in accordance with the present invention.

The one-way flow coupling FC provided at the distal end of the transfer conduit TC is shown specifically in accompanying FIG. 5. In this regard, a distal shut-off valve 58 is disposed in-line with the transfer coupling TC and serves to complement the shut-off functions provided by the proximal valve 55 depicted in FIG. 3. The flow coupling FC is most preferably a female coupling 60 which mates with the male coupling 62 associated with the supply nipple 64 of the supply tank ST. Flow stops 60a and 62a are disposed in the couplings 60, 62 and are maintained in a fluid-tight seal therewithin by virtue of tension and compression springs 60b, 62b, respectively. Therefore, when disconnected or when the mixture of agricultural chemicals AC1 and AC2 is not flowing within the transfer conduit TC (e.g., by virtue of the shut-off valves 55 and/or 58 being closed), the flow stops will be seated in a fluid-tight manner within the couplings 60 and 62, respectively. However, under influence of the flow of agricultural chemical mixture, each of the flow stops 60a and 62a will unseat against the bias force of their respective springs 60b and 62 be thereby allowing the agricultural chemical mixture to be introduced into the supply tank ST. In such a manner, the mixture of agricultural chemicals may be introduced into the supply tank ST without exposure to the user.

In use, the pressurizing fluid will be transferred from the cylinder 24 and distributed equally between the holding compartments HC1 and HC2 by virtue of the manifold assembly 26. As a result, when a mixture of the agricultural chemicals AC1 and AC2 is desired to be introduced to the supply tank ST, the flow coupling FC associated with the transfer conduit TC will be mated with the coupling 62 associated with the supply tank's nipple 64. The valves 55 and 58 may then be opened. Since the liquid agricultural chemicals AC1 and AC2 within each of the holding compartments HC1 and HC2 will be under substantially equivalent pressure by virtue of the pressurizing fluid, they will each be forcibly expelled from the holding compartments HC1 and HC2, through risers 30, 32, respectively. Metering of the flow of liquid agricultural chemicals AC1 and AC2 is provided by the orifice 48 and/or via metering screws 49a, 49b. so that the proper desired ratio of agricultural chemicals are mixed within channel 42 and the mixing unit 46.

Another embodiment of a multi-compartment tank system 100 according to the present invention is shown in accompanying FIGS. 6-9. As shown therein, the tank system 100 is generally comprised of a pair of symmetrically shaped, side-by-side located tank units 102, 104. The tank units 102, 104 are each comprised of a cylindrically shaped central wall panel 102a, 104a and opposed arcuate shaped end panels 102b, 104b rigidly joined to (e.g., by welding) to the central wall panels 102a, 104a, respectively. The tank units 102, 104 are rigidly joined to one another by means of a cylindrical sleeve member 106 so as to circumferentially bound the space 107 established between the opposed end panels 102b, 104b of the tank units 102, 104, respectively. The sleeve member 106 is most preferably welded to the central wall panels 102a, 104a along the entire circumference of its terminal end edges. As a result, the tank system 100 will present itself as a generally cylindrically shaped elongate tank having arcuate ends formed by the visible ones of end panels 102b and 104b.

The tank units 102, 104 are mounted on a pedestal 108 for purposes of transport and handling. The pedestal 108 preferably includes a pair of elongate width-wise separated tubular runner members 108a which are rigidly joined to one another by a pair of tubular cross-support members 108b. The separation distances between the pairs of runner members 108a and the cross-support members 108b are selected so as to accommodate the separated forks associated with conventional fork-lift equipment. In this regard, the tubular members 108a and 108b preferably have a rectangular cross-sectional geometry sized so as to allow the forks associated with such conventional fork-lift equipment to be inserted into their respective rectangular cross-sectional interiors 108a' and 108b' as shown in FIGS. 6 and 7.

The tank units 102, 104 are each supported above the pedestal 108 by upwardly inclined paired leg supports 110, 112 having one end rigidly coupled to a respective runner member 108a, and the other end rigidly coupled to a respective angle member 114, 116. The angle members 114, 116 are, in turn, rigidly coupled via welding to opposite sides of the central wall panels 102a, 104a, respectively. U-shaped tie-down supports 110a, 112a are welded to a respective one of the legs 110, 112 so as to allow the tank system 100 to be securely fastened to a transport vehicle (e.g., the flat bed truck FBT shown in FIG. 1).

Figure 6:
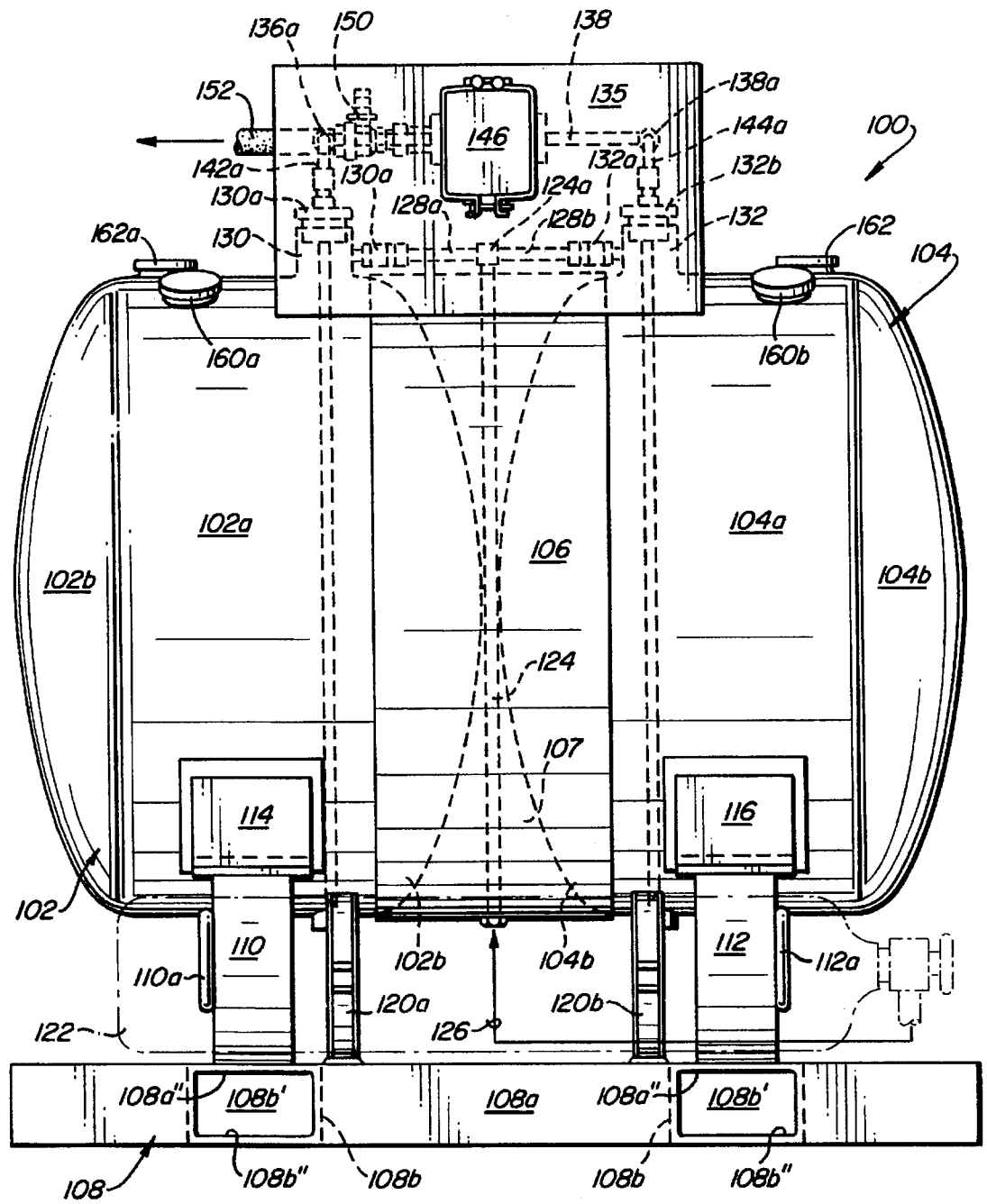
FIG. 6 is a side elevational view showing another preferred embodiment of the multi-compartment tank system in accordance with the present invention.
Figure 7:
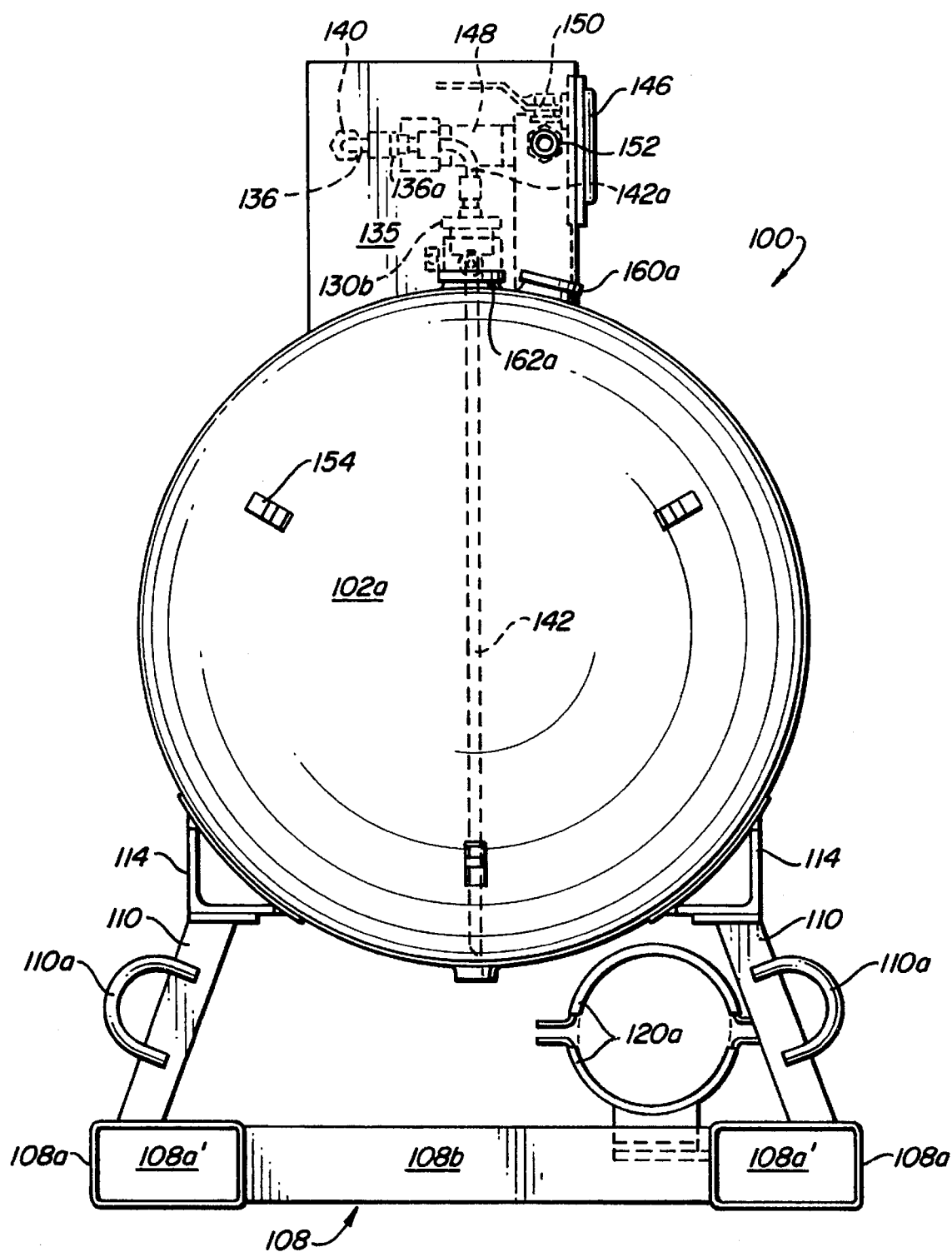
FIG. 7 is an end elevational view of the multi-compartment tank system shown in FIG. 6.

It will further be observed in FIGS. 6 that access to the rectangular cross-sectional interiors 108b' of the cross-support member 108b is permitted by correspondingly shaped rectangular cut-outs 108b" being formed in the opposed side walls of the runner members 108a. These cut-outs 108b" therefor each establish a bridge panel 108a" of runner members 108a to which the lower ends of the leg supports 110, 112 are respectively joined. The bridge panels 108a" functionally provide an area of reduced strength which beneficially deforms should the tank system 100 be inadvertently mishandled (e.g., dropped from an extreme height as might occur when loading/unloading the tank system 100 relative to the flat bed truck FBT). This deformation of the bridge panels 108a" therefore prevents the tank units 102, 104 from being damaged should such mishandling occur.

The pedestal 108 carries a pair of longitudinally (i.e., relative to the elongate axis of the tank system 100) separated cylinder clamps 120a, 120b which served to securely and positionally retain a pressurized fluid cylinder 122 (shown in phantom line in FIG. 6) which contains a pressurizing fluid (e.g., nitrogen or like inert gas) for the contents within the tank units 102, 104. The cylinder 122 is fluid connected to the lower end of riser conduit 124 via any suitable fluid line (schematically represented in FIG. 6 by reference numeral 126. The upper end of the riser conduit 124 terminates in a T-coupling 124a from which branch supply conduits 128a, 128b extend. In this regard, it will be observed in FIG. 6 that the riser conduit 124 extends upwardly in the space 107 established between the adjacent arcuate end panels 102a, 104a which are surrounded by the sleeve member 106. As such, the supply riser 124 is protected and concealed within the tank system 100 by means of the sleeve member 106.

Figure 8:
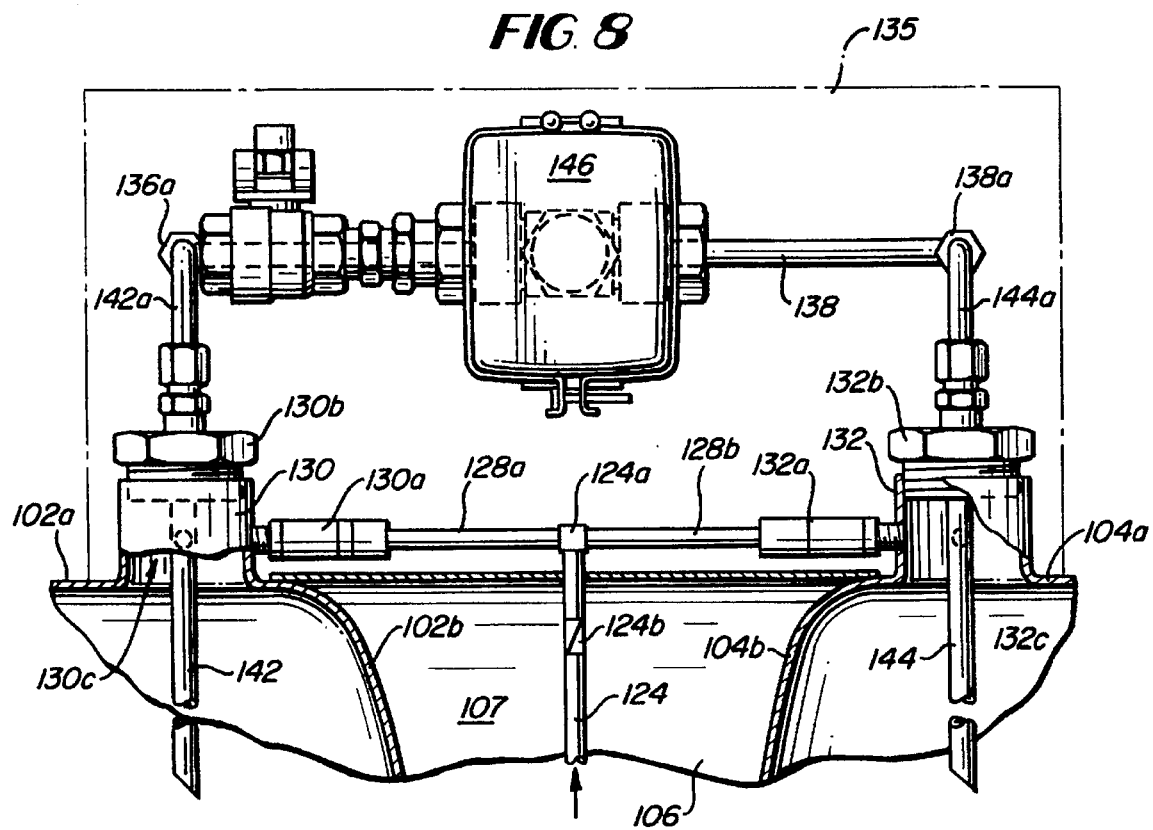
FIG. 8 is a side elevational view, partly in section, showing the manifold assembly employed in the multi-compartment tank system of FIG. 6.
Figure 9:
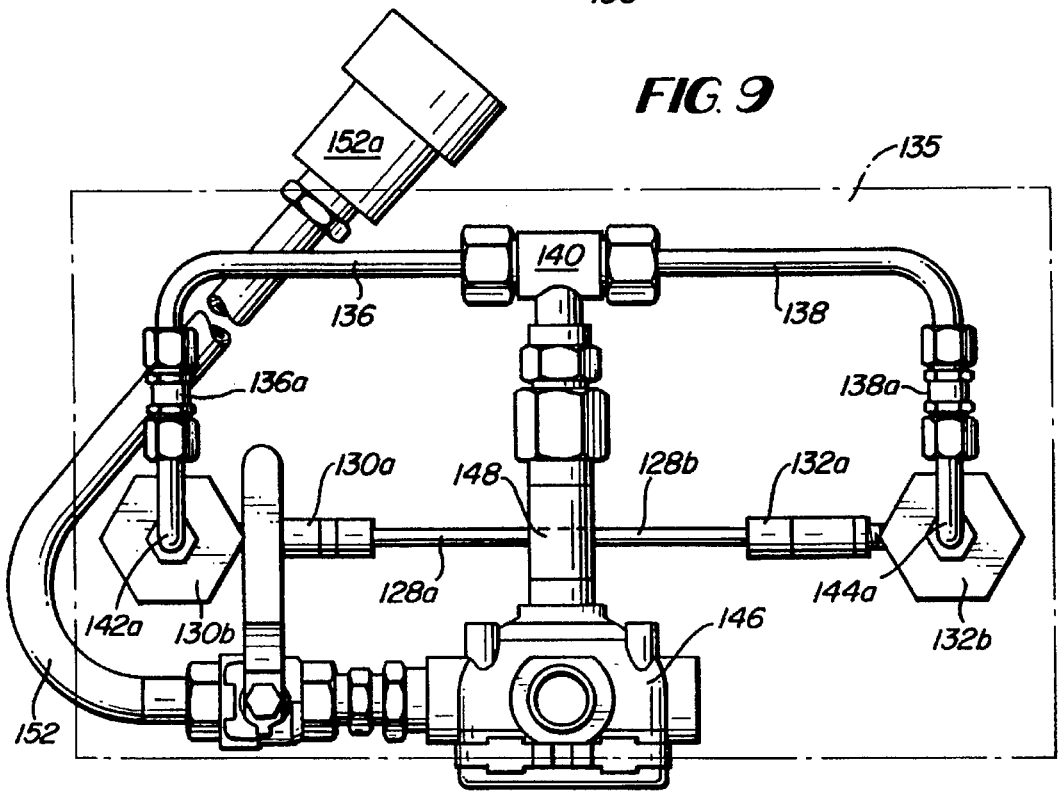
FIG. 9 is a top plan view of the manifold assembly shown in FIG. 8.

As is perhaps best seen in FIGS. 8 and 9, the branch supply conduits 128a, 128b extend in opposite directions radially from the riser conduit 124 and are coupled to nipples 130a, 132a associated with cylindrical tank access ports 130, 132, respectively. A one-way valve 124b is provided in the riser conduit 124 to allow the pressurizing fluid to only flow in a direction from the cylinder 122 toward the T-coupling 124a.

The manifold assembly 134 is housed within a security cover 135, and is shown in greater detail in FIGS. 8 and 9. In this regard, the manifold assembly 134 includes a pair of liquid supply conduits 136, 138 each having one end connected to a T-coupling 140 so as to be in opposed axial alignment with one another. The opposite end of each liquid supply conduit 136, 138 is fluid-connected to the upper terminal end 142a, 144a of a respective liquid supply riser 142, 144 via in-line couplings 136a, 138a. The liquid supply risers 142, 144 each extend the entire vertical dimension within the tank units 102, 104, respectively, so as to ensure that the liquid contents therein may be accessed. Furthermore, it will be observed particularly in FIG. 8 that the liquid supply risers 142, 144 are co-located with the tank access ports 130, 132 and extend concentrically through the fluid-tight tank port caps 130b, 132b so as to establish an annular space 130c, 132c therearound within the ports 130, 132, respectively. Thus, the pressurizing fluid from the branch supplies 128a, 128b will respectively be discharged into the annular spaces 130c, 132c within the tank ports 130, 132.

The T-coupling 140 is fluid-connected to a flow meter 146 by a stub conduit 148. Since the respectively liquids delivered to the T-coupling 140 by supply conduits 136, 138 are in opposed flow directions (i.e., due to the axially opposed alignment of the conduits 136 and 138), and under equal pressure (i.e., due to the equalized pressure of the pressurizing fluid supplied to each tank unit 102, 104) the liquids within the T-coupling 140 will experience turbulent mixing conditions. The stub conduit 148 therefore provides a quieting chamber for the mixed liquids to ensure that the flow of such mixed liquids is accurately measured by the flow meter 146.

The mixed liquids are discharged from the flow meter 146 through on-off control valve 150 and then on to a flexible transfer hose 152 having a one-way flow coupling 152a (similar to that described previously with reference to FIG. 5) at its terminal end. Preferably, the transfer hose 152 will be coiled around hose retainers 154 affixed to the exterior of end panel 102a as shown in FIG. 7.

The tank units 102, 104 may also be provided with fluid-tight access ports 160a, 162a and 160b, 162b, respectively. The ports 160a, 162a may be used as fill ports so that the respective tank units 102, 104 may be replenished with liquid, while the ports 162a, 162b may be used as a convenient site for liquid level gauges (not shown) so that the liquid within the tank units 102, 104 may be displayed. As can now be appreciated, the present invention provides a "closed" system whereby at least two dissimilar liquid agricultural chemicals may be stored in isolation to one another. Moreover, the present invention allows such agricultural chemicals, or other dissimilar liquids, to be mixed in a "closed" system just prior to usage without endangering the user with exposure to such mixture. As a consequence, many (if not all) of the problems noted previously with respect to mixtures of agricultural chemicals can be alleviated by virtue of this invention.

However, while the present invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A portable holding and mixing tank system for at least two dissimilar liquids comprising:

at least two fluid-isolated holding compartments for holding a respective one of said dissimilar liquids;

a source of pressurizing fluid;

a manifold assembly defining respective channels for said dissimilar liquids and said pressurizing fluid which are fluid-connected to each of said holding compartments;

a pressurizing supply conduit which fluid-connects said source of pressurizing fluid to said pressurizing fluid channel;

liquid supply risers each of which fluid-connects a respective one of said dissimilar liquids contained in said holding compartments to said liquid channel defined by said manifold assembly; and a liquid discharge port fluid-connected to said liquid channel defined by said manifold assembly; wherein said at least two dissimilar liquids within each said holding compartment are forcibly introduced by means of said pressurizing fluid therewithin into said liquid channel defined by said manifold assembly and are mixed with one another within said liquid channel prior to discharge through said discharge port, and wherein said at least two fluid-isolated holding compartments are provided by a pair of tank units located in side-by-side relationship so as to establish a space therebetween, and wherein said pressurizing supply conduit is positioned within said established space between said pair of tank units and fluid-connects said source of pressurizing fluid to said pressurizing fluid channel, and wherein said system further comprises a cylindrical sleeve member defining circumferential edges which are rigidly joined to respective ones of said pair of tank units so as to circumferentially bound said space established therebetween.

2. A system as in claim 1, wherein said tank includes supply ports for allowing dissimilar liquids to be introduced separately into said holding compartments.

3. A system as in claim 2, wherein each of said supply ports includes a removable cover.

4. A system as in claim 1, wherein said liquid channels are in axial opposition to one another such that dissimilar liquids mix with one another in opposed flow relationship, and wherein said discharge channel is fluid-connected substantially perpendicularly relative to said opposed flow relationship.

5. A system as in claim 1, wherein said pressurizing fluid channel includes a pair of branch supply conduits fluid-connected to and extending radially from said pressurizing supply conduit;

said tank units each including cylindrical access ports each allowing access to an interior of a respective one of said tank units;

each of said liquid supply risers is concentrically positioned within a respective one of said access ports so as to define an annular space therearound; and each of said pair of branch supply conduits have a terminal end which is fluid connected with a respective one of said access ports so as to supply pressurizing fluid into said defined annular space.

6. A system as in claim 1, further comprising a flexible transfer conduit fluid connectable at a proximal end thereof to said discharge port and includes at a distal end thereof a flow coupling for fluid-connecting said transfer conduit to another tank.

7. A system as in claim 6, wherein said flow coupling includes a flow stop which forms a fluid-tight seal in the absence of liquid flow through said transfer conduit.

8. A system as in claim 7, wherein said flow coupling includes a bias spring for biasing said flow stop in a direction to form said fluid-tight seal.

9. A system as in claim 8, wherein said biasing spring is a tension spring.

10. A portable holding and mixing tank system for at least two dissimilar liquids comprising;
 at least two fluid-isolated holding compartments for holding a respective one of said dissimilar liqiuds;
 a source of pressurizing fluid;
 a manifold assembly defining respective channels for said dissimilar liquids and said pressurizing fluid which are fluid-connected to each of said holding compartments;
 a pressurizing supply conduit which fluid-connects said source of pressurizing fluid to said pressurizing fluid channel;
 liquid supply risers each of which fluid-connects a respective one of said dissimilar liquids contained in said holding compartments to said liquid channel defined by said manifold assembly; and
 a liquid discharge port fluid-connected to said liquid channel defined by said manifold assembly; wherein
 said at least two dissimilar liquids within each said holding compartment are forcibly introduced by means of said pressurizing fluid therewithin into said liquid channel defined by said manifold assembly and are mixed with one another within said liquid channel prior to discharge through said discharge port, and wherein
 said system further comprises a pedestal for supporting said holding compartments, said pedestal including;
 (i) a pair of separated tubular runner members extending in a lengthwise direction;
 (ii) a pair of separated tubular cross-support members extending in a widthwise direction and rigidly interconnecting said pair of runner member; and
 (iii) pairs of inclined support legs extending between said runner members and said fluid-isolated holding compartments.

11. A system as in claim 10, wherein said runner members and said cross-support members each have open ends to allow fork lift insertion.

12. A portable holding and mixing tank system for at least two dissimilar liquids comprising:
 at least one pair of side-by-side tank units for holding a respective dissimilar liquid and defining a space therebetween;
 a cylindrical sleeve member joined rigidly to said tank units so as to circumferentially bound said space therebetween;
 at least two liquid supply risers positioned within respective ones of said tank units for withdrawing a dissimilar liquid therefrom;
 a pressurization system for pressurizing the dissimilar liquids in said tank units and thereby allow the dissimilar liquid to be withdrawn therefrom through said respective liquid supply risers; and
 a manifold assembly fluid-connected to said at least two liquid supply risers for mixing said dissimilar liquids withdrawn from said tank units and discharging a mixture of said dissimilar liquids.

13. A system as in claim 12, wherein said pressurization system includes a pressurization riser conduit extending upwardly through said space defined between said tank units.

14. A system as in claim 12, wherein said tank units each include a cylindrical access port, and wherein each of said liquid supply risers is co-located with a respective said access port.

15. A system as in claim 14, wherein each of said liquid supply risers is concentrically co-located within said respective access port so as to establish therewithin an annular space, and wherein said pressurization system includes a pressurization riser conduit, and a pair of branch supply conduits each having one end fluid-connected to said pressurization riser conduit, and another end fluid-connected to a respective one of said access ports so that pressurizing fluid is introduced into said annular spaces thereof.

16. A system as in claim 15, wherein said pressurization system includes a source of pressurization fluid which is fluid-connected to said pressurization riser conduit.

17. A system as in claim 15, wherein said pair of branch conduits extend in radially opposite directions from said pressurization riser conduit.

18. A system as in claim 12, wherein said manifold assembly includes liquid supply conduits fluid connected to a respective one of said liquid supply risers, a T-coupling fluid connected to each of said liquid supply conduits, and a stub conduit fluid-connected to said T-coupling, wherein said liquid supply conduits are axially opposed to one another so that dissimilar liquids mix within said T-coupling and are discharged as a mixture into said stub conduit.

19. A system as in claim 18, further comprising a flow meter fluid-connected to said stub conduit for measuring flow of the mixed dissimilar liquids, and wherein said stub conduit provides a quieting chamber for the mixed liquids to ensure that the flow thereof is measured accurately by the flow meter.

20. A system as in claim 12, further comprising a pedestal for supporting said at least two tank units, said pedestal including;
 a pair of separated tubular runner members extending in a lengthwise direction;
 a pair of separated tubular cross-support members extending in a widthwise direction and rigidly interconnecting said pair of runner members; and
 paired inclined support legs extending between said runner members and said tank units.

21. A system as in claim 20, wherein said runner members and said cross-support members each have open ends to allow fork lift insertion.

22. A system as in claim 21, wherein said open end of said cross-support members are each formed by opposed cut-out regions in said runner members.

23. A system as in claim 22, wherein said cut-out regions establish respective bridge panels of said runner members, and wherein lower ends of said paired support legs are joined to said bridge, panels, said bridge panels being deformable in response to the tank system being dropped so as to prevent deformation of the tank units.

24. A system as in claim 1, further comprising a single pressurizing fluid supply conduit extending within said tank interior space between said at least two fluid-isolated holding compartments which fluid-connects said source of pressurizing fluid to said pressurizing fluid channel, and wherein said pressurizing fluid channel is fluid-connected to each of said at least two fluid-isolated holding compartments so that said pressurizing fluid supplied by said single pressurizing fluid supply conduit is distributed substantially equally therebetween.

* * * * *